(12) United States Patent
Norberg et al.

(10) Patent No.: US 11,320,048 B2
(45) Date of Patent: *May 3, 2022

(54) SHIFT CONTROL ARRANGEMENT IN A GEARBOX

(71) Applicant: Scania CV AB, Södertälje (SE)

(72) Inventors: Peer Norberg, Södertälje (SE); Per Arnelöf, Vendelsö (SE)

(73) Assignee: Scania CV AB, Södertälje (SE)

( * ) Notice: Subject to any disclaimer, the term of this patent is extended or adjusted under 35 U.S.C. 154(b) by 189 days.

This patent is subject to a terminal disclaimer.

(21) Appl. No.: 16/620,578

(22) PCT Filed: Jun. 4, 2018

(86) PCT No.: PCT/SE2018/050570
§ 371 (c)(1),
(2) Date: Dec. 9, 2019

(87) PCT Pub. No.: WO2019/022656
PCT Pub. Date: Jan. 31, 2019

(65) Prior Publication Data
US 2020/0166134 A1    May 28, 2020

(30) Foreign Application Priority Data
Jul. 24, 2017  (SE) .................... 1750956-3

(51) Int. Cl.
*F16H 63/36* (2006.01)
*F16H 61/16* (2006.01)
(Continued)

(52) U.S. Cl.
CPC ............. *F16H 63/36* (2013.01); *F16H 61/16* (2013.01); *F16H 61/18* (2013.01); *F16H 63/32* (2013.01); *F16H 2200/0034* (2013.01)

(58) Field of Classification Search
CPC .......... F16H 63/36; F16H 61/16; F16H 61/18; F16H 63/32; F16H 2200/0034;
(Continued)

(56) References Cited

U.S. PATENT DOCUMENTS 1,719,520 A    7/1929  Reville
3,354,741 A    11/1967 Johnston, Jr. et al.
(Continued)

FOREIGN PATENT DOCUMENTS

CH    247583 A     3/1947
CN    102720835 A  10/2012
(Continued)

OTHER PUBLICATIONS

Scania CV AB, International Application No. PCT/SE2018/050570, International Preliminary Report on Patentability, dated Jan. 28, 2020.
(Continued)

*Primary Examiner* — Victor L MacArthur
(74) *Attorney, Agent, or Firm* — Moore & Van Allen PLLC; W. Kevin Ransom

(57) ABSTRACT

A shift control arrangement in a gearbox comprising a first shift rod having a first end connectable to a first power means and second end connected to a first shift fork; a second shift rod having a first end connectable to a second power means and a second end connected to a second shift fork; a first set of grooves arranged in the first shift rod, a second set of grooves arranged in the second shift rod; and first and second lock pins arranged between the first and second shift rods, which together with the first and second set of grooves restricts or allows axial movement of the respective first and second shift rod.

12 Claims, 16 Drawing Sheets

(51) Int. Cl.
*F16H 61/18* (2006.01)
*F16H 63/32* (2006.01)

(58) Field of Classification Search
CPC ..... F16H 2200/2035; F16H 2200/2005; F16H 3/54; F16H 37/046; F16H 61/70; F16H 37/042
See application file for complete search history.

(56) References Cited

U.S. PATENT DOCUMENTS

| | | | |
|---|---|---|---|
| 4,120,212 A | 10/1978 | Philipsen | |
| 6,196,944 B1 | 3/2001 | Schmitz | |
| 10,808,815 B2 * | 10/2020 | Norberg | F16H 57/023 |
| 2009/0139355 A1 | 6/2009 | Cho | |

FOREIGN PATENT DOCUMENTS

| | | | |
|---|---|---|---|
| CN | 103234028 A | 8/2013 | |
| CN | 105276175 A | 1/2016 | |
| CN | 105889501 A | 8/2016 | |
| DE | 102008013752 A1 | 9/2008 | |
| EP | 0748966 A1 | 12/1996 | |
| EP | 1152174 A2 | 11/2001 | |
| JP | 02180379 A | 7/1990 | |
| WO | 2010130389 A1 | 11/2010 | |
| WO | WO-2015183159 A1 * | 12/2015 | ........... F16H 57/023 |

OTHER PUBLICATIONS

Scania CV AB, Chinese Application No. 201880046877.0, First Office Action, dated Sep. 1, 2020.
Scania CV AB, International Patent Application No. PCT/SE2018/050570, International Search Report, dated Jun. 26, 2018.
Scania CV AB, International Patent Application No. PCT/SE2018/050570, Written Opinion, dated Jun. 26, 2018.
Scania CV AB, European Application No. 18838180.0, Extended European Search Report, dated Feb. 26, 2021.

* cited by examiner

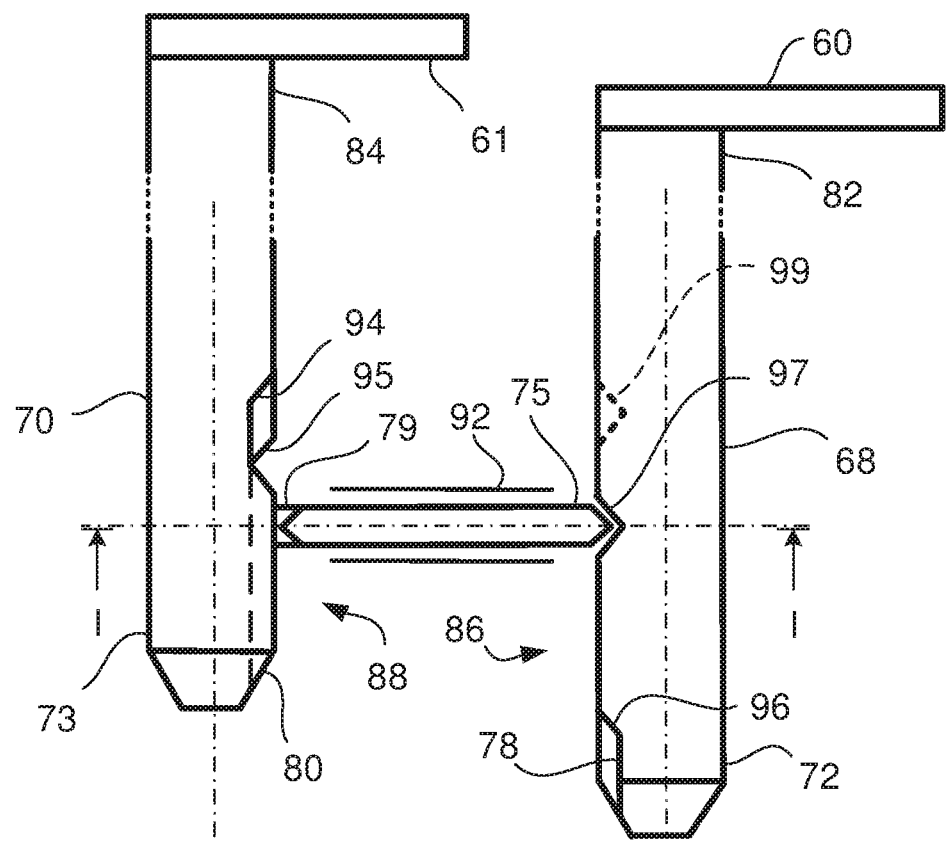
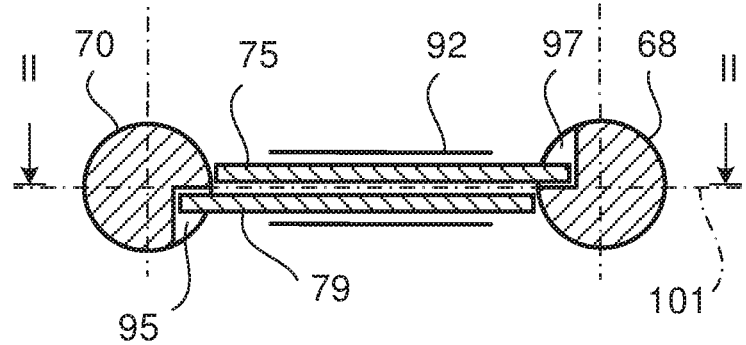
Fig. 6a
Fig. 6b

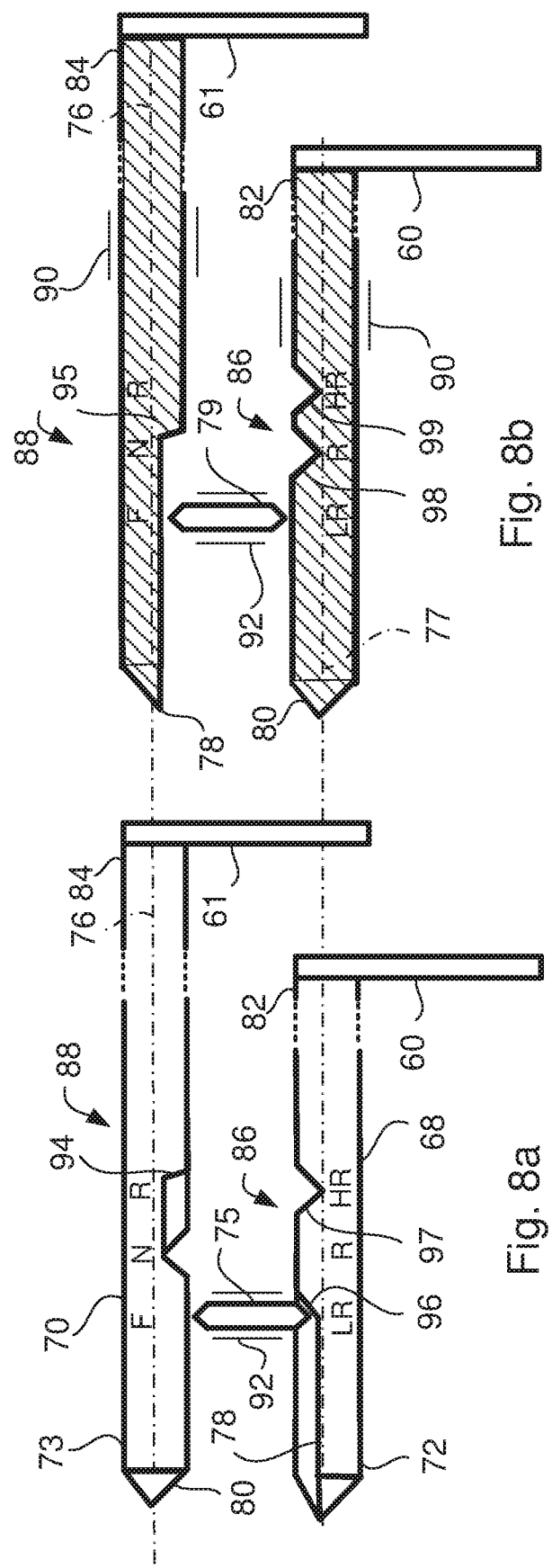

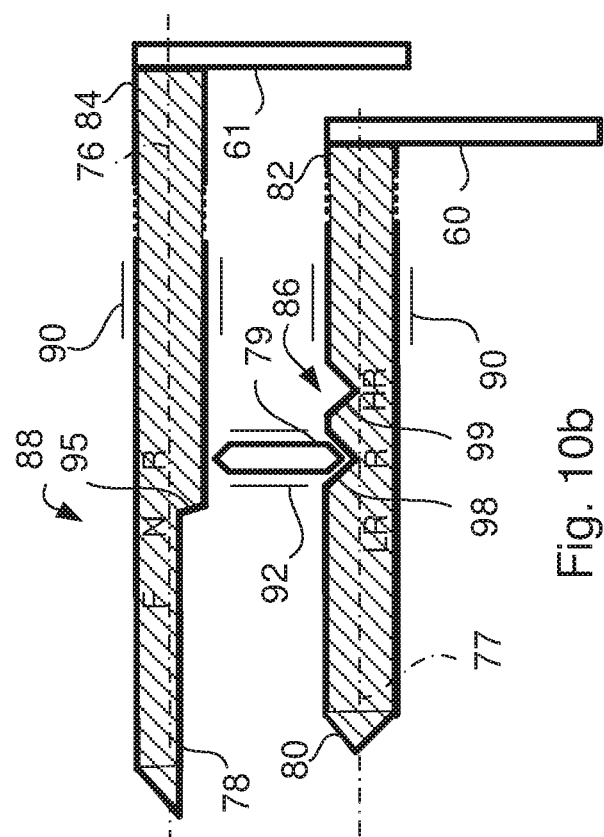
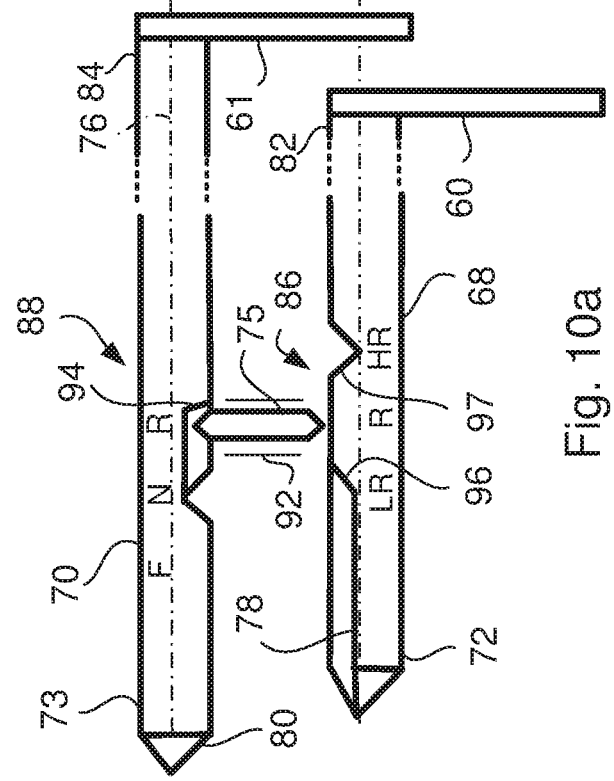
Fig. 10a
Fig. 10b

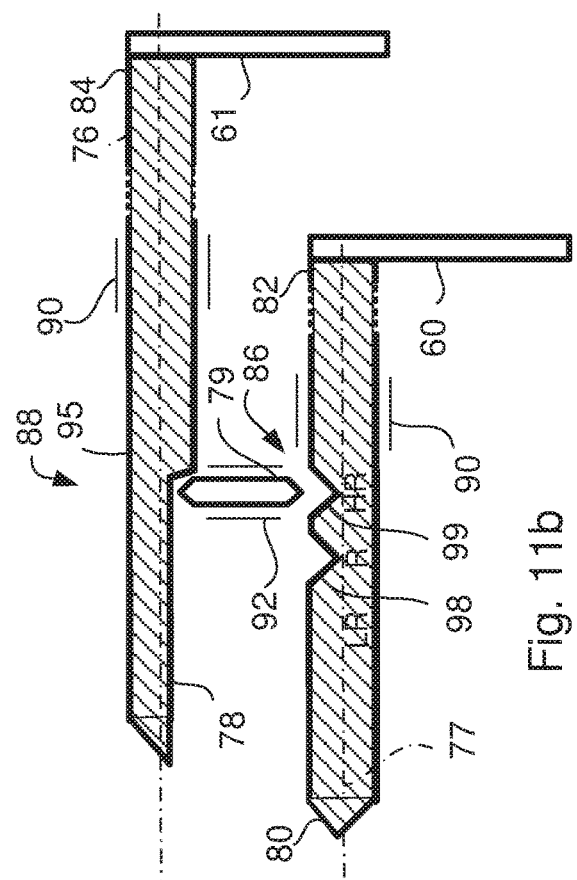
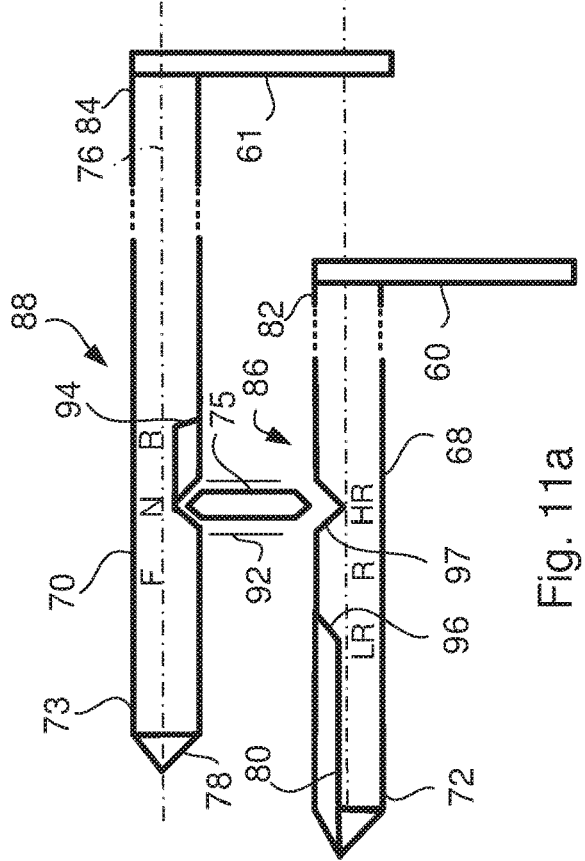

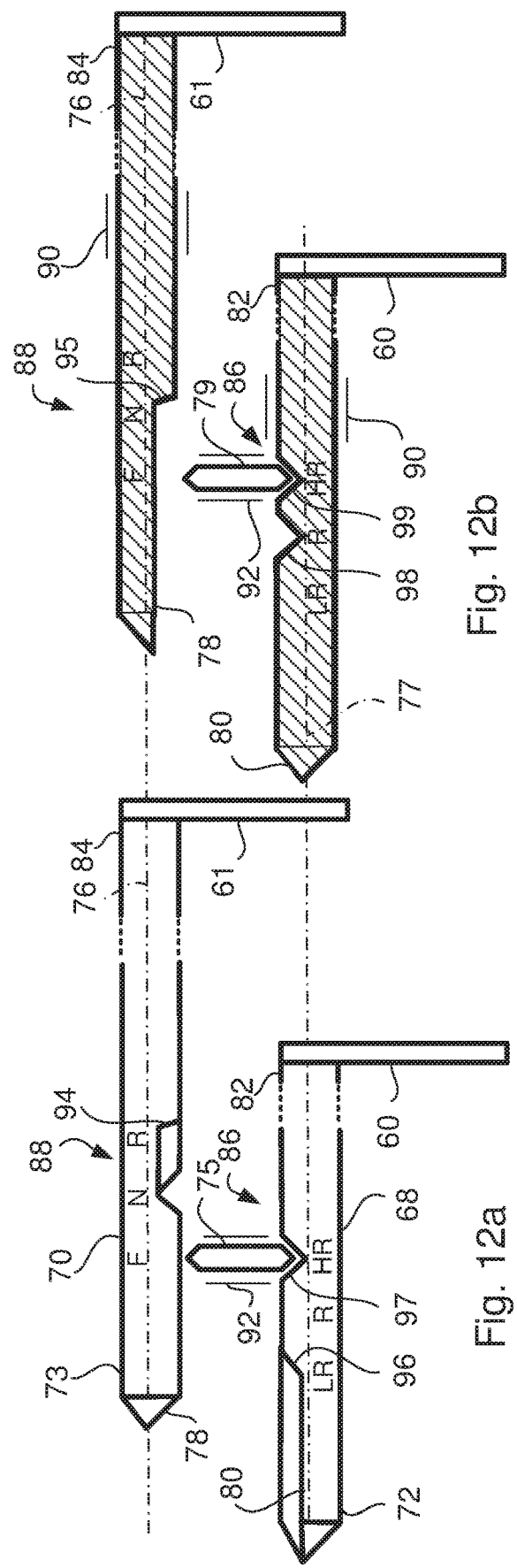

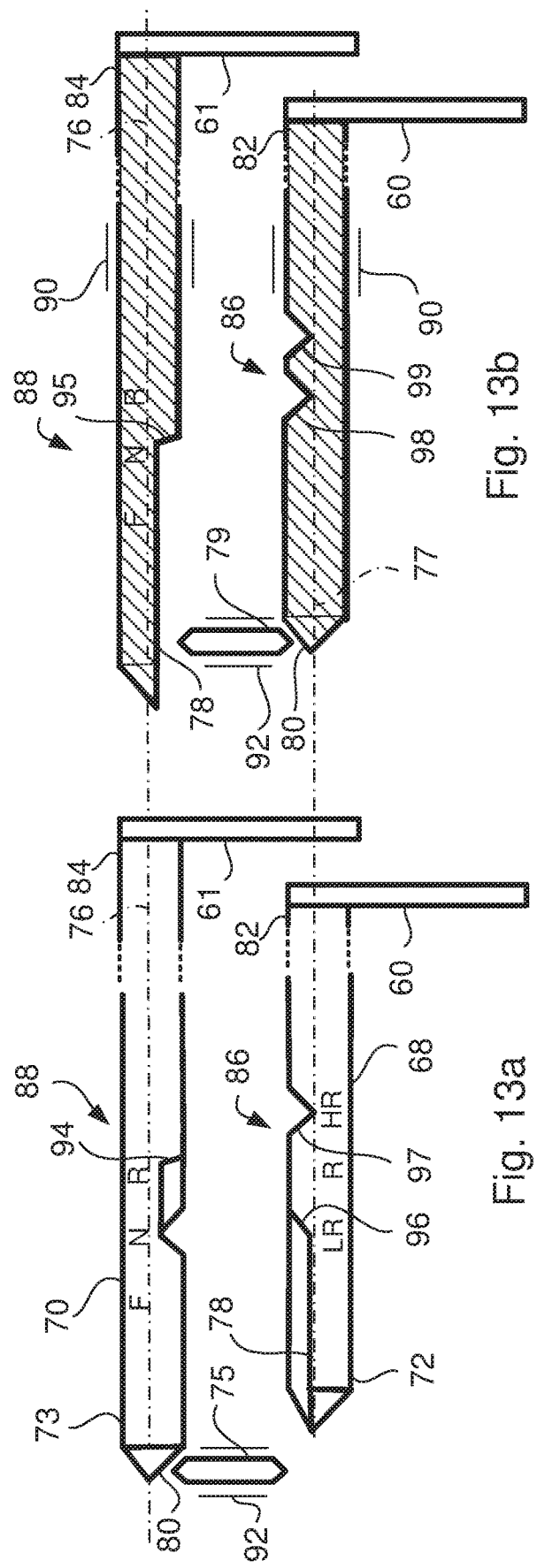

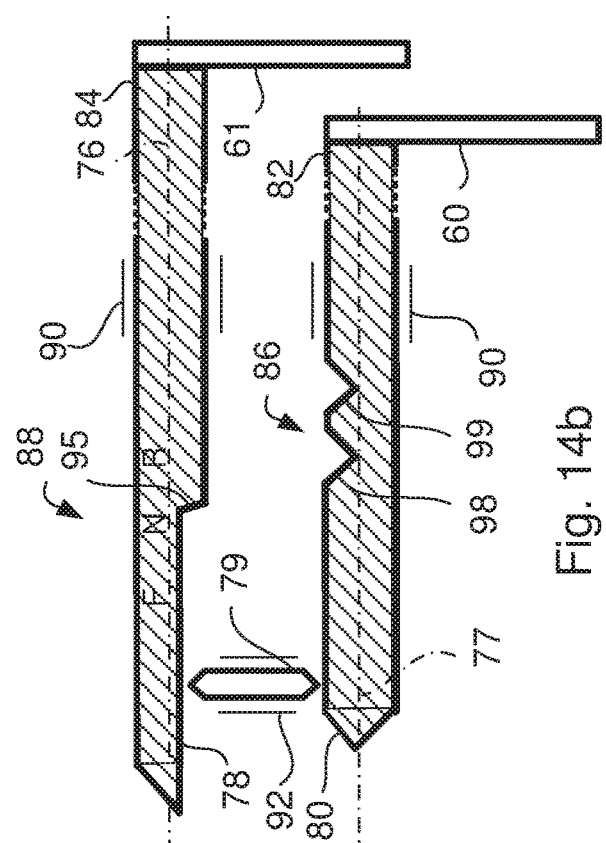
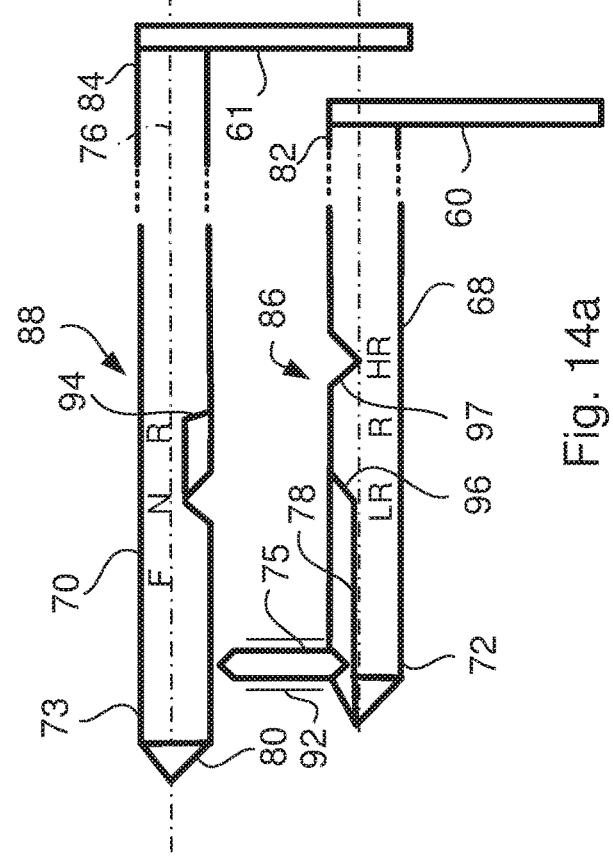

SHIFT CONTROL ARRANGEMENT IN A GEARBOX

CROSS-REFERENCE TO RELATED APPLICATIONS

This application is a national stage application (filed under 35 § U.S.C. 371) of PCT/SE2018/050570, filed Jun. 4, 2018 of the same title, which, in turn, claims priority to Swedish Application No. 1750956-3 filed Jul. 24, 2017; the contents of each of which are hereby incorporated by reference.

FIELD OF THE INVENTION

The invention relates to a shift control arrangement in a gearbox for vehicles, a gearbox comprising such a shift control arrangement and a vehicle comprising such a gearbox, according to the appended claims.

BACKGROUND OF THE INVENTION

In vehicles, and especially for heavier vehicles such as trucks, a range gearbox device may often be connected a main gearbox device to double the number of gears. Such an auxiliary gearbox device may include a planetary gear, which may have a low gear and a high gear, wherein the shift facilities of the main gearbox device may be divided into a low range gear position and a high range gear position. In low range gear, a downshift may take place through the planetary gear, and in the high range gear, the gear ratio may be 1:1 in the planetary gear.

The range gearbox device may be provided between the main gearbox device and a propeller shaft coupled to the drive wheels of the vehicle. The main gearbox device may be accommodated in a main gearbox housing and the range gearbox device may be accommodated in a range gearbox housing. The range gearbox device may comprise an input shaft coupled to the main gearbox device and an output shaft and between the input shaft and the output shaft, the planetary gear may be disposed. The planetary gear may comprise three components, which may be rotatable arranged relative to each other namely a sun gear wheel, a planet carrier with planet gear wheels and a ring gear wheel. With knowledge of the number of teeth of the sun gear wheel and the ring gear wheel, the relative speed of the three components can be determined during operation. In a range gearbox device the sun gear wheel can be rotatable connected to the input shaft, a number of planet gear wheels which engage said sun gear wheel, which planet gear wheels may be rotatable mounted on the planet carrier which may be fixedly connected to the output shaft, and the ring gear wheel which surrounds and engages the planet gear wheels.

In a known range gearbox device the low range gear position and high range gear position may be obtained by displacing an axially displaceable sleeve between the low range gear position, in which the ring gear may be rotationally locked relative to the range gearbox housing, and high range gear position in which the ring gear wheel may be rotatable relative to the range gearbox housing and where the ring gear wheel, the planet gear wheels and the sun gear wheel rotate as a common unity.

The axially displaceable coupling sleeve may be provided with splines and by controlling the transmission to synchronous speed between the two components to be connected, an axial displacement of the coupling sleeve along the two components may be made possible in order to connect them. When the components should be detached, the transmission may be controlled so that torque balance occurs between the components so that the coupling sleeve may not transmit torque. It then may be possible to move the coupling sleeve along the components in order to disengage them from each other.

The document U.S. Pat. No. 6,196,944 shows a planetary gear comprising a sun gear, a planet carrier with planet gears and a ring gear. The sun gear may be connected to the input shaft by means of a coupling sleeve in a low range gear position and disengaged from the input shaft in a high range gear position. In the high range gear position the input shaft may be connected to the planet carrier by means of the same coupling sleeve. The ring gear may be firmly connected to a gearbox housing. The known planetary gear may be arranged in an auxiliary gearbox, having only two gear positions.

The reverse gear in a transmission in a vehicle may often be arranged in the main gearbox, which then comprises a gear, which may be engaged when the vehicle is to be driven in the reversed direction. The gear wheel, which may be intended for the reverse gear, causes an elongation of the main gearbox device, and an undesired increase in weight of the vehicle. The reverse gear wheel may rotate in the opposite direction to the other gears in the main gearbox device, which may cause losses. Said gear wheel, which may be intended for the reverse gear, may have a tendency to produce undesirable noise in the transmission, which may be a result of an intermediate gear wheel disposed between a lay shaft and a main shaft in the main gearbox device.

Therefore, the reverse gear in the main gearbox device may be replaced by means of a reverse gear arranged in the range gearbox device. The reverse gear arranged in the range gearbox device may be shifted by means a second axially displaceable sleeve. When the range gearbox device may be shifted into the reverse gear, the second axially displaceable sleeve may connect the ring gear wheel with the propeller shaft at the same time as the first axially displaceable sleeve may connect the planet carrier with the range gearbox housing.

The document U.S. Pat. No. 6,196,944 shows a gearbox for motor vehicles comprising a planetary gear comprising a first and a second sleeve acting on the planet carrier, the ring gear, the gearbox housing and the output shaft. The first and second sleeves may be controlled as one connected unit.

The axial displacement of the first and second coupling sleeves may be provided with a first and second shift fork arranged in an outside circumferential groove in the respective coupling sleeve. The shift forks may be influenced by a first and second power means, which may be a pneumatic or hydraulic cylinder. Shift rods connected to the power means and the shift forks may transfer the axial movement from the power means to the shift forks. When assembling and disassembling the range gearbox device to and from the main gearbox device the shift rods may be connected to and disconnected from the power means.

In order to prevent damage in the range gearbox device due to selecting an impropriate gear when shifting gears in the range gearbox device the shift control arrangement for the range gearbox device may be provided with a shift interlock. Such an impropriate selection of gears may be the selection of the low range gear when the range gearbox device may be shifted into the reverse gear. In this case both gear wheels and the coupling sleeves could be damaged.

A known shift interlock for a transmission is disclosed in document U.S. Pat. No. 4,120,212. The shift interlock comprises a pair of lock pins, which may be disposed in lock pin bores arranged in a housing. The lock pins may be designed to engage annular grooves in a pair of shift rods, which may be restricted to move axially when the lock pin engages the annular groove. Thus, an impropriate gear when shifting gears can be avoided. However, the known shift interlock may only be appropriate for transmissions in which only one shift rod may be controlled when shifting between a forward and reverse mode.

SUMMARY OF THE INVENTION

Known transmissions often requires complete disassembly of the gearbox for replacement of the range gearbox device, which means that it may take much time and it may become costly to repair the range gearbox device. In addition, when the vehicle is assembled at the construction plant it may take much time to assemble the range gearbox device due to the shift interlock in the shift control arrangement.

There is a need to further develop a shift control arrangement in a gearbox in which an inadvert selection of a forward or reverse mode may be prevented. There is also a need to further develop a shift control arrangement in a gearbox in which make it easy to assemble and disassemble the gearbox in a vehicle. There is also a need to develop a shift control arrangement in a gearbox that may be easy to repair. In addition, there is a need to develop a shift control arrangement in a gearbox, which save manufacturing and maintenance costs. There is also a need to further develop a shift control arrangement in a gearbox, which arrangement has a compact design and only need a small space at the gearbox.

The object of the invention is therefore to develop a shift control arrangement in a gearbox in which an inadvert selection of a forward or reverse mode may be prevented.

Another object of the invention is to develop a shift control arrangement in a gearbox, which shift control arrangement may make it easy to assemble and disassemble the gearbox in a vehicle.

A further object of the invention is to develop a shift control arrangement in a gearbox that may be easy to repair.

A further object of the invention is to develop a shift control arrangement in a gearbox, which may save manufacturing and maintenance costs.

A further object of the invention is to develop a shift control arrangement in a gearbox, which arrangement may have a compact design and may only need a small mounting space at the gearbox.

The herein mentioned objects may be achieved by the above-mentioned shift control arrangement in a gearbox according to the independent claims.

According to the invention the shift control arrangement in a gearbox may comprise a first shift rod, provided with a first and second end part, which first end part may be connectable to a first power means and the second end part may be connected to a first shift fork; a second shift rod, provided with a first and second end part, which first end part may be connectable to a second power means and the second end part may be connected to a second shift fork. A first set of grooves may be arranged in the first shift rod and a second set of grooves may be arranged in the second shift rod. A first and a second lock pin may be arranged between the first and second shift rods, which first and a second lock pins, together with the first and second set of grooves, may be arranged to restrict or allow axial movement of the respective first and second shift rod. The first set of grooves may comprise at least one groove arranged in the first shift rod above a plane passing through the first and second shift rods, and at least one groove arranged below the plane, and the second set of grooves may comprise at least one groove arranged in the second shift rod above the plane and at least one groove may be arranged below the plane.

Such shift control arrangement may effectively prevent an inadvert selection of a forward or reverse mode. With such shift control arrangement it may be easy to assemble and disassemble the gearbox be in a vehicle. The shift control arrangement may also be easy to repair. In addition, the shift control arrangement may save manufacturing and maintenance costs. A situation where the gearbox would be damaged may be when the gearbox is shifted into a low range gear and the reverse gear mode may be selected. Another example is when the gearbox may be shifted into the reverse mode and where the forward mode may be selected. Such impropriate selection may be made by a driver of a vehicle in which the gearbox may be arranged or when a component that controls the gearbox fails.

According to a further aspect of the invention, the first lock pin may be arranged above the plane and the second lock pin may be arranged below the plane. Such arrangement may have a compact design and may only need a small mounting space at the gearbox. The shift control arrangement may also make it easy to assemble and disassemble the gearbox in a vehicle.

According to a further aspect of the invention, the first and second lock pins may be arranged in a common guide hole in a main gearbox housing, which at least partly surround the main gearbox device. Such arrangement may have a compact design and may only need a small mounting space at the gearbox. The shift control arrangement may also make it easy to assemble and disassemble the gearbox in a vehicle. In addition, shift control arrangement may also be easy to produce since only one guide hole in the main gearbox housing has to be made. When arranging the lock pin at the main gearbox housing, the axial extension of a range gearbox device arranged on the main gearbox device may be reduced. The range gearbox device can therefore be designed with a short axial extension, which reduces the weight of the range gearbox device. Thus, assembling and disassembling the gearbox in the vehicle may be easy.

According to a further aspect of the invention, the first lock pin may be arranged on the second lock pin, and the first and second lock pins may be slidable arranged against each other. Such arrangement has a compact design and only need a small space at the gearbox. The surfaces of the lock pins may act as guide surfaces to each other. The guide hole may contain a lubricant for achieving a smooth sliding of the lock pins against each other's surfaces. The surfaces of the lock pins may also be provided with a friction reducing coating, so that they may slide smooth on each other.

According to a further aspect of the invention the second set of grooves, may comprise a first and second groove, each extending in an axial direction of the second shift rod, so that each of the first and second groove may be common for two shift gears in the gearbox. Such a shift control arrangement may effectively prevent an inadvert selection of a forward or reverse mode in the gearbox. When each of the first and second grooves has an axial extension, so that the first and second grooves may be common for two shift gears, the gearbox may not be shifted to the forward or reverse mode in situations where the gearbox could be damaged.

According to a further aspect of the invention, the first groove may relate to a neutral and a reverse shift gear in the gearbox and the second groove may relate to a neutral and a forward shift gear in the gearbox. When each of the first and second grooves may have an axial extension, so that the first and second grooves may be common for two shift gears, the gearbox may not be shifted to the forward or reverse mode in situations where the gearbox could be damaged.

According to a further aspect of the invention, the first set of grooves may comprise a third, fourth, fifth and sixth groove, each related to a shift gear in the gearbox. The grooves in the first shift rod may relate to the different possibilities of shift gears in the gearbox. Their function may be to receive the lock pins in different gearshift modes.

According to a further aspect of the invention, the first groove may be arranged to cooperate with the third and fourth grooves by means of the first lock pin and the second groove may be arranged cooperate with the fifth and sixth grooves by means of the second lock pin. When the first lock pin is received in the first groove, it will not restrict the movement of the first shift rod. When the first lock pin may be received in the third and fourth grooves, it may not restrict the movement of the second shift rod. When the second lock pin may be received in the second groove, it may not restrict the movement of the first shift rod. When the second lock pin may be received in the fifth and sixth grooves, it may not restrict the movement of the second shift rod.

According to a further aspect of the invention, the third and fourth grooves may relate to a low range gear and a high range gear, respectively, and the fifth and sixth grooves may relate to a reverse gear and a high range gear, respective. When the gearbox is shifted into a low range gear, the reverse gear mode may not be selected. Thus, an inadvert selection of a reverse mode may be prevented which would otherwise damage the gearbox. When the gearbox is shifted into the reverse mode, the forward mode may not be selected. Thus, an inadvert selection of a forward mode may be prevented which would otherwise damage the gearbox.

According to a further aspect of the invention, the first end part of the first shift rod may be connectable to the first power means by means of a first coupling element; and in that the first end part of the second shift rod may be connectable to the second power means by means of a second coupling element. Such first and second coupling elements may make it possible to connect and remove the shifting rods from the power means when assembling and disassembling the gearbox in the vehicle.

According to a further aspect of the invention, the first and second shift forks may be arranged in a range gearbox device, which may be connectable to the main gearbox device. Thus, the shift control arrangement may be arranged to control the gear shifting in the range gearbox device.

According to a further aspect of the invention the first set of grooves together with the first and a second lock pins may be arranged to prevent the first shift rod to move axially and to allow the second shift rod to move axially; and in that the second set of grooves together with the first and a second lock pins may be arranged to prevent the second shift rod to move axially and to allow the first shift rod to move axially. The grooves may be arranged to receive the first and a second lock pins for different shift gears and thereby restrict either the first or second shift rod to move axially in order to prevent an inadvert selection of a forward or reverse shift gear mode, which may otherwise damage the gearbox.

A reverse gear in the power train may be achieved when a first axially movable coupling sleeve may be arranged to engage a planet carrier with the range gearbox housing and a second axially movable coupling sleeve may be arranged to engage a ring gear with an output shaft. The reverse gear can be easily shifted to by controlling the first and second axially displaceable coupling sleeves. However, a malfunction in a control system of the gearbox may unintentional be activating the power means and move one of the first and second axially displaceable coupling sleeves. Thus, if the gearbox may be unintentional shifted into the reverse gear when the vehicle is moving forward it may cause damage to the gearbox. The shift control arrangement in a gearbox may be arranged to avoid such an incident.

Additional objectives, advantages and novel features of the invention will be apparent to one skilled in the art from the following details, and through exercizing the invention. While the invention is described below, it should be apparent that the invention is not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, preferred embodiments with reference to the enclosed drawings, in which:

FIGS. 6a-6b show schematically a shift control arrangement according to an embodiment from above and in a cross section, FIGS. 7a-12b show schematically a shift control arrangement according to an embodiment in different shift gear positions, FIGS. 13a-13b show schematically the shift control arrangement according to an embodiment in a first pre-assembled position, FIGS. 14a-14b show schematically the shift control arrangement according to an embodiment in a second pre-assembled position, FIGS. 16a-16b show schematically two different embodiments of a cross section through line III-III of the second shift rod in FIG. 7a.

DETAILED DESCRIPTION OF THE DRAWINGS

Figure 1:
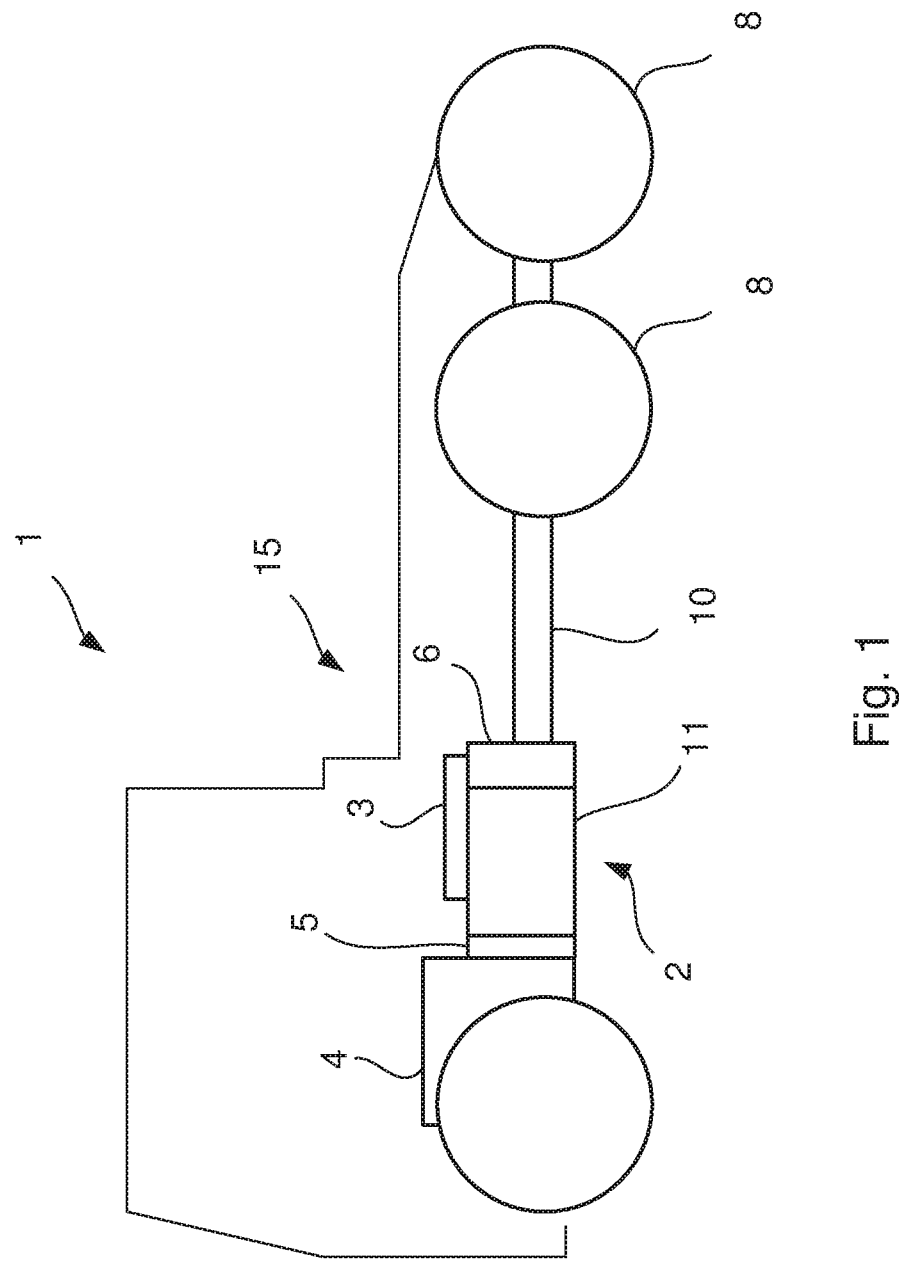
FIG. 1 shows schematically a vehicle in a side view with a gearbox having a shift control arrangement according to an embodiment.

FIG. 1 shows schematically a vehicle 1 in a side view with a gearbox 2, which may be provided with a shift control arrangement 3 according to an embodiment. The vehicle 1 may also be provided with an internal combustion engine 4, a clutch 5, a propeller shaft 10 and drive wheels 8. The internal combustion engine 4 may be coupled to the gearbox 2 via the clutch 5. The gearbox 2 comprises a main gearbox device 11 and a range gearbox device 6. The main gearbox device 11 may be surrounded by a main gearbox housing 12 and the range gearbox device 6 may be surrounded by a range gearbox housing 13. However, the main gearbox device 11 and the range gearbox device 6 may be surrounded by a common housing. The gearbox 2 may be connected to the drive wheels 8 of the vehicle 1 via the propeller shaft 10. Instead of, or in addition to, an internal combustion engine 4 the vehicle may be provided with an electric engine as part of a powertrain 15 in the vehicle 1.

Figure 2:
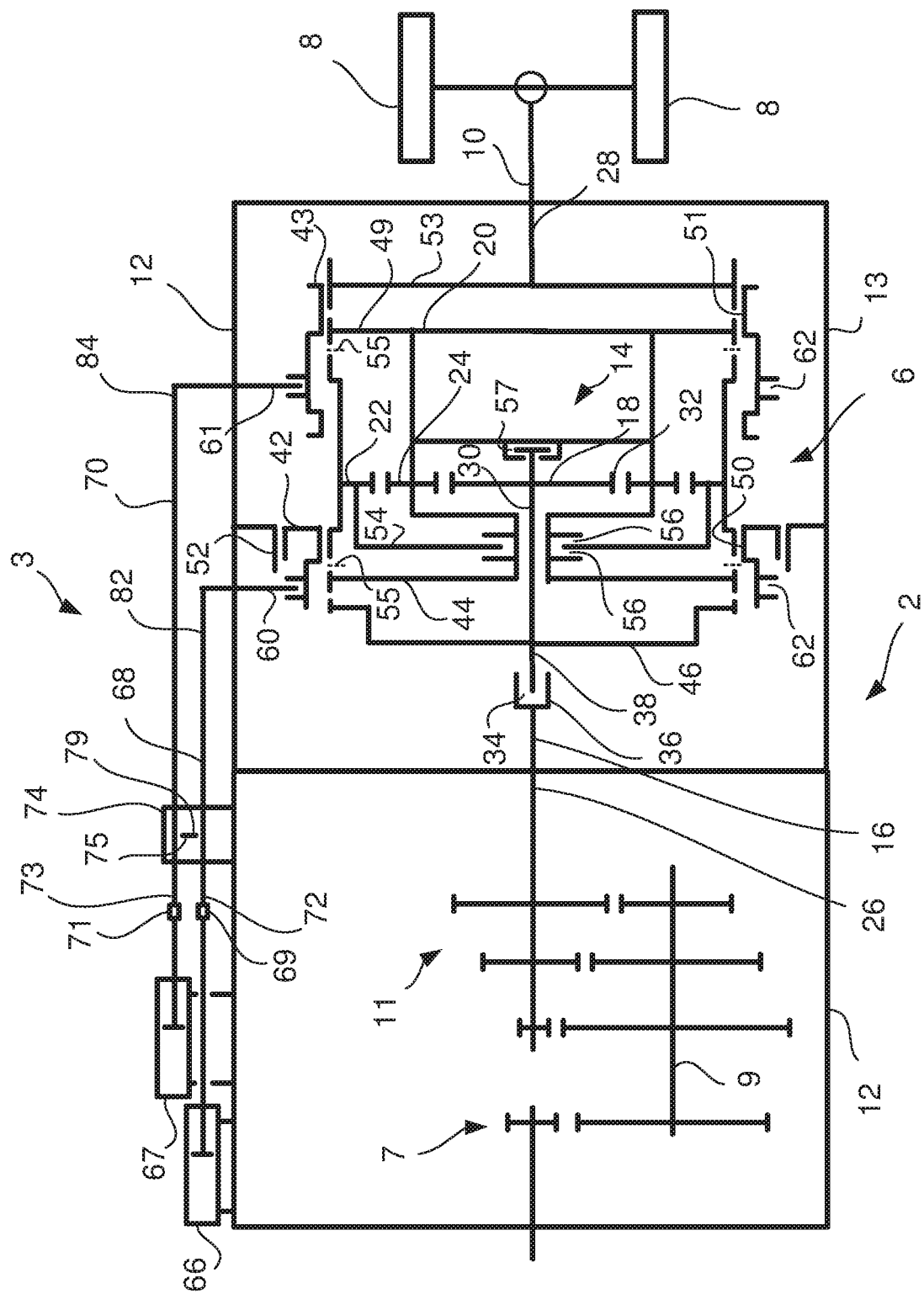
FIG. 2 shows schematically a cross section of the gearbox in a low range position provided with a shift control arrangement according to an embodiment.

FIG. 2 shows a schematic sectional view of a gearbox 2 having a shift control arrangement 3 according to an embodiment. The range gearbox device 6 comprises a planetary gear 14 which has a low and a high gear, so that the shifting capability of the gearbox 2 can be divided into a low range gear position and a high range gear position. In a first gear position, corresponding to the low range gear position a downshift takes place in the planetary gear 14. In the high range gear position the gear ratio may be 1:1 in the planetary gear 14. FIG. 2 shows the range gearbox device 6 in the first gear position, corresponding to the low range gear position.

The gearbox 2 also comprises a split gearbox device 7 and a lay shaft 9. The main gearbox device 11 may be provided with a main shaft 26, which may be connected to the planetary gear 14 of the range gearbox device 6. The planetary gear 14 may comprise three main components, which may be rotatable arranged in relation to each other, namely a sun gear 18, a planet carrier 20 and a ring gear 22. A number of planet gears 24 may be rotatable arranged with bearings on the planet carrier 20. With knowledge of the number of teeth 32 of sun gear 18 and the ring gear 22, the relative gear ratio of the three components can be determined. The sun gear 18 may be connected to the main shaft 26 of the main gearbox device 11 and the planet gears 24 engage the sun gear 18. The ring gear 22 may surround and engage the planet gears 24. The main shaft 26 may be connected to a shaft 38 of the sun gear 18 by means of a splines connection 34, which has an axial extent and which allows an axial displacement between the main shaft 26 and the shaft 38 of the sun gear 18 when assembling and disassembling the range gearbox device 6 to and from the gearbox 2. The input shaft 16 may at its end be provided with a sleeve 36, which internally cooperates with the circumference of a portion of the shaft 38 of the sun gear 18 by mean of the splines connection 34. Thus, the splines connection 34 may be designed such that the range gearbox device 6 can be assembled and disassembled in one piece to and from the rest of the gearbox 2. Thus, the maintenance costs may be reduced, since the time required for the repair may decrease.

A first axially displaceable coupling sleeve 42 may in the first gear position be arranged to connect the range gearbox housing 13 with the ring gear 22 and in a second gear position arranged to disconnect the range gearbox housing 13 from the ring gear 22. The first axially displaceable coupling sleeve 42 may in the first gear position be arranged to disconnect the shaft 38 of the sun gear 18 from the planet carrier 20. In the second position, the first axially displaceable coupling sleeve 42 may connect the shaft 38 of the sun gear 18 with the planet carrier 20.

A second axially displaceable coupling sleeve 43 may in the first and second gear positions be arranged to interconnect the planet carrier 20 with the output shaft 28. The second axially displaceable coupling sleeve 43 may in a third gear position be arranged to couple the ring gear 22 with an output shaft 28 of the gearbox 2. The output shaft 28 may be coupled to the propeller shaft 10 of the vehicle 1. In the third gear position, corresponding to a reverse gear, the first axially displaceable coupling sleeve 42 may be arranged to disconnect the shaft 38 of the sun gear 18 from the planet carrier 20 and instead may be arranged to interconnect the planet carrier 20 with the range gearbox housing 13.

The first axially displaceable coupling sleeve 42 may on an inner and outer surface be provided with first splines 50, which on the inner surface may be arranged to interact with the corresponding first splines 50 arranged on the ring gear 22. The first splines 50 on the outer surface may be arranged to interact on the inner periphery of a projection 52, which may be fixedly connected to the range gearbox housing 13. The first splines 50 on the inner surface of the first axially displaceable coupling sleeve 42 may also be arranged to cooperate with corresponding first splines 50 arranged on the input shaft 16. Corresponding first splines 50 disposed on the input shaft 16 may be made on the periphery of a first sprocket 46, which may be mounted on the shaft 38 of the sun gear 18. However, it may also be possible to arrange the first sprocket 46 on the input shaft 16 instead of on the shaft 38 of the sun gear 18. Thus, the first sprocket 46 may be arranged on either side of the splines connection 34. The first splines 50 on the inner surface of the first axially displaceable coupling sleeve 42 may also be arranged to cooperate with corresponding first splines 50 arranged on the planet carrier 20. Corresponding first splines 50 disposed on the planet carrier 20 may be made on the periphery of a second sprocket 44, which may be mounted on the planet carrier 20.

The second axially displaceable coupling sleeve 43 may on an inner surface be provided with second splines 51, which may be arranged to cooperate with corresponding second splines 51 arranged on the ring gear 22, the planet carrier 20 and the output shaft 28. The corresponding second splines 51 arranged on the planet carrier 20 may be formed on the periphery of a third sprocket 49, which may be mounted on the planet carrier 20. The corresponding second splines 51 provided on the output shaft 28 may be formed on the periphery of a fourth sprocket 53, which may be mounted on the output shaft 28.

An axial stop 54 arranged on the planet carrier 20 may be adapted to abut against the ring gear 22, which axial stop 54 may prevent the ring gear 22 to be moved axially. The axial stop 54 may consist of a disc-shaped plate, which by a first thrust bearing 56 may be mounted on the planet carrier 20. The axial stop 54 may be rotatable relative to the planet carrier 20 and the input shaft 16, and follows the rotation of the ring gear 22. The axial stop 54 fixates the ring gear 22 axially, and leads to that the axial bearing of the input shaft 16 in the gearbox 2 may be subjected to less stress when the gears 18, 22, 24 may be provided with helical teeth. However, instead of, or in combination with the axial stop 54 a pair of thrust bearings 55 may be arranged on both distal surfaces of the ring gear 22. Thus, the thrust bearings 55 may be arranged between the ring gear and the planet carrier 20. A second thrust bearing 57 may be disposed between the shaft 38 of the sun gear 18 and the planet carrier 20 to accommodate axial forces generated in the sun gear 18.

The low gear in the gearbox 2 may obtained by displacing the first coupling sleeve 42 axially, so that the ring gear 22 may be connected to the range gearbox housing 13.

Figure 3:
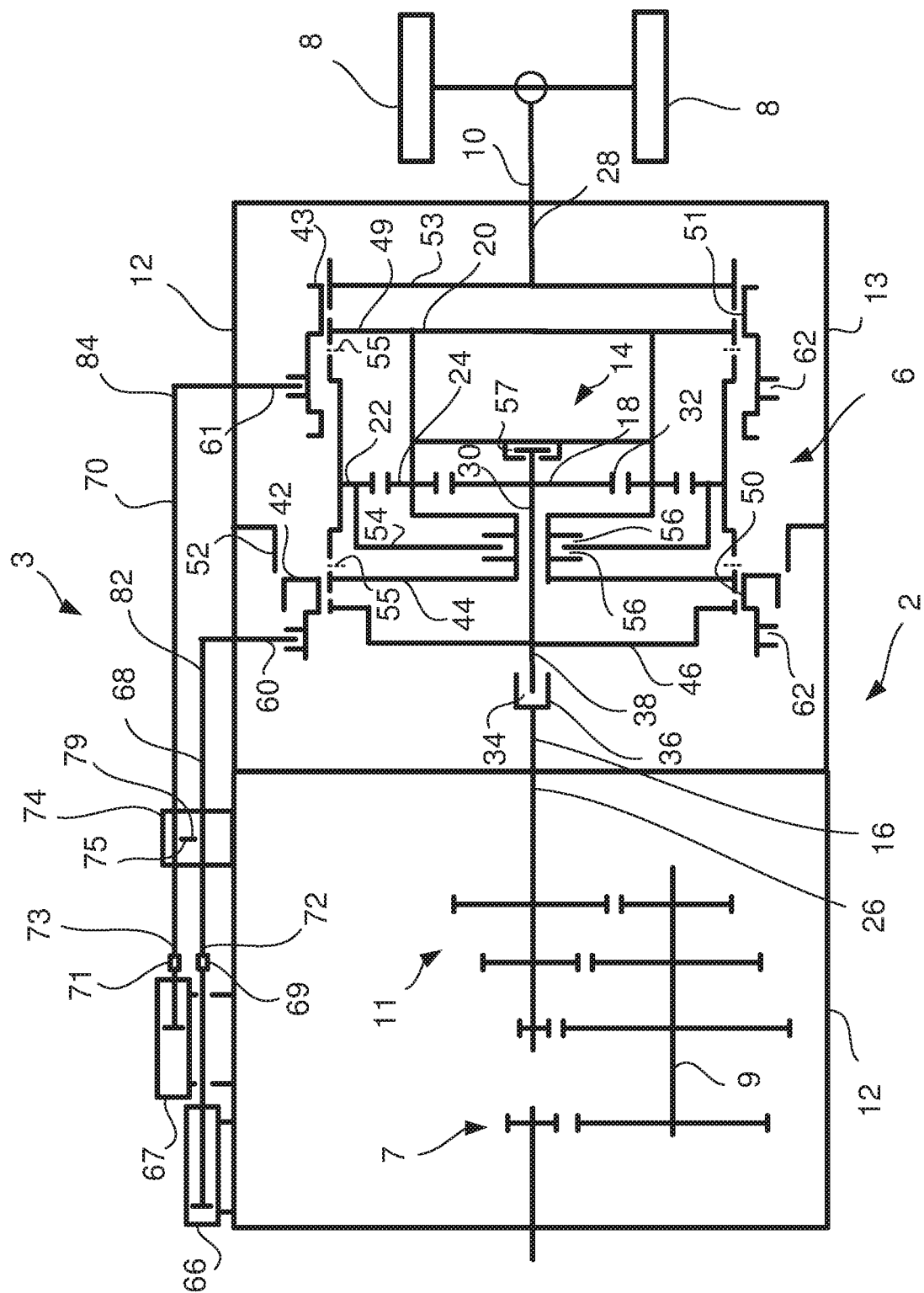
FIG. 3 shows schematically a cross section of the gearbox in a high range position provided with a shift control arrangement according to an embodiment.

The range gearbox device 6 according to an embodiment functions as follows when shifting from the first to the second gear position, that is, from the low range gear position to the high range gear position. In FIG. 2, the range gearbox device 6 may be shifted into the low range gear position, which means that the first coupling sleeve 42 has been shifted to a position to connect the ring gear 22 with the range gearbox housing 13. Thus, when the range gearbox device 6 may be in the low range gear position, a downshift may take place through the planetary gear 14. The shifting operation from the low range gear position to the high range gear position may be made by disconnecting the first ring gear 22 from the range gearbox housing 13 by means of the first coupling sleeve 42 when the torque transmission between the ring gear 22 and range gearbox housing 13 ends, which may be accomplished by disconnecting the internal combustion engine 4 from the main gearbox device 11 through disconnection of the clutch 5 and disconnecting the output shaft from the planet gear carrier by displacing the second axially displaceable coupling sleeve 43 to a neutral position. A neutral position may be achieved by displacing the second coupling sleeve 43 to a position where the second coupling sleeve 43 only may be connected to the fourth sprocket 53, which may be mounted on the output shaft 28. When the first coupling sleeve 42 no longer transmits any torque and the planetary gear 14 has been brought to a standstill position the axial displacement of the first coupling sleeve 42 may be possible. In the high range gear position the first coupling sleeve 42 may be displaced to a position where the first coupling sleeve 42 connects the planet carrier 20 to the first sprocket 46. When the range gearbox device 6 has been shifted into the high range gear position the clutch 5 may be engaged and the planet carrier 20 may be synchronized to the speed of the output shaft 28 before the second coupling sleeve 43 may be displaced to a position for connecting the planet carrier 20 to the output shaft 28. Thus, the range gearbox device 6 may operate in the high range gear position. FIG. 3 shows the range gearbox device 6 in the second gear position, corresponding to the high range gear position.

In order to shift gear to the low range gear position, the first coupling sleeve 42 may be shifted by the first shift fork 60 in the right direction in FIG. 3 for releasing the planet carrier 20 from first sprocket 46 and thus from the input shaft 16. This may be made possible when the torque transmission between the input shaft 16 and planet carrier 20 ends, which may be accomplished by disconnecting the internal combustion engine 4 from the main gearbox device 11 by means of the clutch 5 and disconnect the planetary gear 14 from the output shaft 28 by means of axially displace the second coupling sleeve 43 to a neutral position. When the first coupling sleeve 42 no longer transmits any torque and the planetary gear 14 has been brought to a standstill position the axial displacement of the first coupling sleeve 42 may be possible. The first coupling sleeve 42 may then shifted by the first shift fork 60 in the direction of the range gearbox housing 13 to thereby connect the ring gear 22 with the range gearbox housing 13. When the ring gear 22 is stationary, the first coupling sleeve 42 may be displaced axially and interfere with the first splines 50 on the ring gear 22 and the range gearbox housing 13. Thus, in the low range gear position a downshift may occur through the range gearbox device 6. When the range gearbox device 6 has been shifted into the low range gear position the clutch 5 may be engaged and the planet carrier 20 may be synchronized to the speed of the output shaft 28 before the second coupling sleeve 43 may be displaced to a position for connecting the planet carrier 20 to the output shaft 28.

Figure 4:
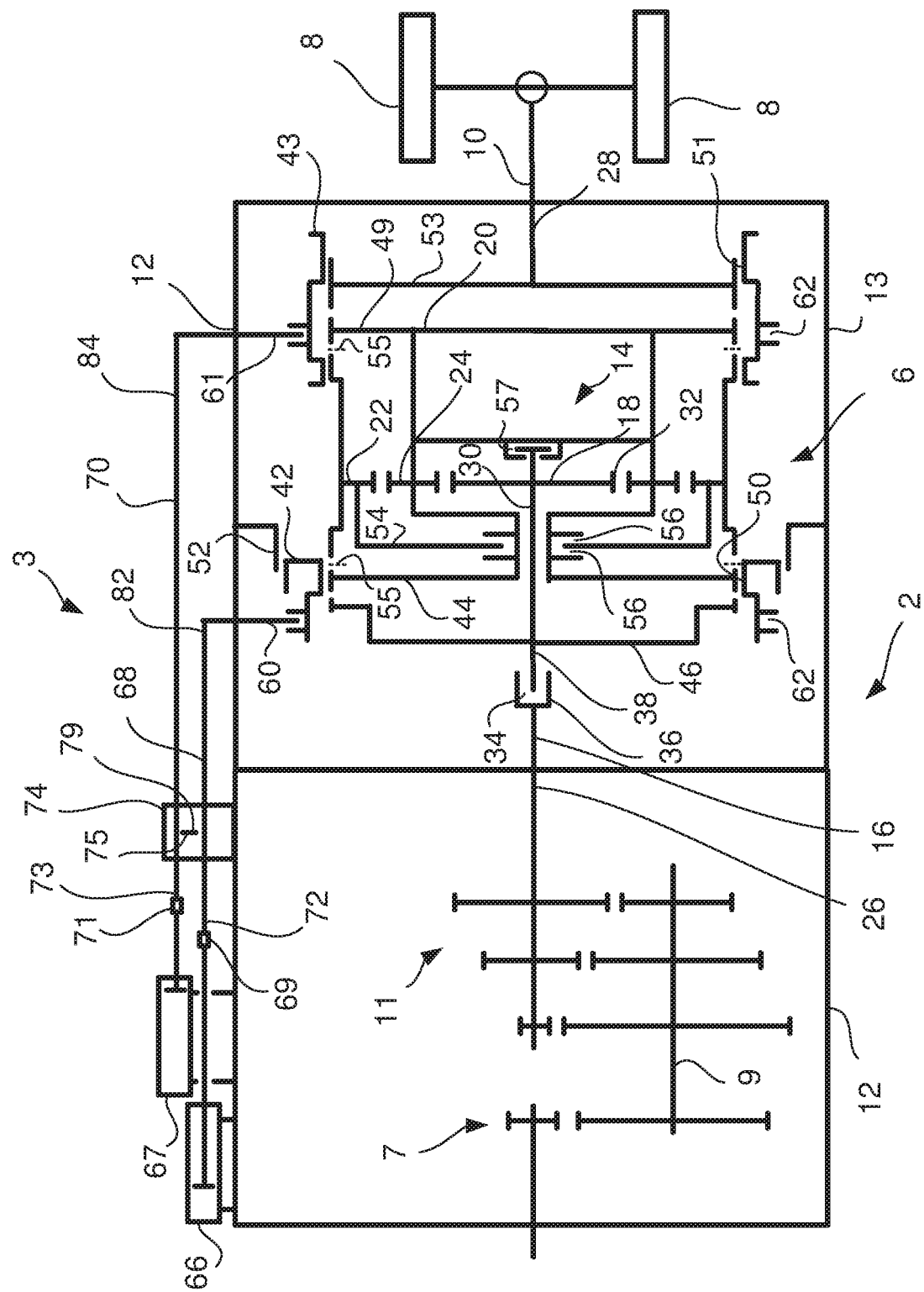
FIG. 4 shows schematically a cross section of the gearbox in a reverse mode provided with a shift control arrangement according to an embodiment.

FIG. 4 shows the range gearbox device 6 in the third gear position, corresponding to the reverse gear position mode. The second axially displaceable sleeve 43 may be in the third gear position, i.e. in the reverse gear position arranged to connect the ring gear 22 with output shaft 28. Thus, the second coupling sleeve 43 may be shifted by the second shift fork 61, so that the ring gear 22 may be connected to the output shaft 28. The first coupling sleeve 42 may be shifted by the first shift fork 60 to couple the planet carrier 20 with the range gearbox housing 13. The displacement of the respective coupling sleeve 42, 43 may be performed when the input and the output shaft 16, 28 are stationary, which corresponds to a stationary operating state of the vehicle 1, or when the vehicle 1, travels backwards and the planetary gear 14 are disconnected from the output shaft 28 by means of the second coupling sleeve 43. The second coupling sleeve 43 may thereafter be displaced to connect the output shaft 28 with the second coupling sleeve 43 when the speed of the planetary gear 14 may be synchronized to the speed of the output shaft 28 by means of the engine 4. In order to provide a stationary position of the input shaft 16 the clutch 5 of the vehicle 1 may be transferred to a disconnected mode. When the range gearbox device 6 is operated in the third gear position, torque may be transmitted from the input shaft 16 to the sun gear 18 and further to the planet gears 24, which transmits the torque to the ring gear 22 and further to the output shaft 28 via the second coupling sleeve 43. The planet carrier 20 may be stationary as the first coupling sleeve 42 connects the planet carrier 20 with the range gearbox housing 13.

When the first coupling sleeve 42 is displaced from the right to left in FIG. 2 the first coupling sleeve 42 may shift the range gearbox device 6 from the low range gear position to the reverse gear position and further to the high range gear position.

The shift control arrangement 3 according to an embodiment comprises first and second power means 66, 67 which may be provided for the axial displacement of the first and second coupling sleeves 42, 43. The first power means 66 may be connected to a first shift fork 60, which may be arranged in an outside circumferential groove 62 in the first coupling sleeve 42. The first power means 66 may be connected to the first shift fork 60 by means of a first shift rod 68, which may be detachable from the first power means 66 by means of a first coupling element 69. The second power means 67 may be connected to a second shift fork 61, which may be arranged in an outside circumferential groove 62 in the second coupling sleeve 43. The second power means 67 may be connected to the second shift fork 61 by means of a second shift rod 70, which may be detachable from the second power means 67 by means of a second coupling element 71. The first and second power means 66, 67 may be a pneumatic or hydraulic cylinder, or an electric actuator. The shift rods 68, 70 connected to the power means 66, 67 transfers the axial movement from the power means 66, 67 to the shift forks 60, 61. When assembling and disassembling the range gearbox device 6 to and from the main gearbox device 11 the shift rods 68, 70 may be connected to and disconnected from the power means 66, 67. The shift rods 68, 70 and power means 66, 67 are schematically shown on top of the main gearbox housing 12 and on the range gearbox housing 13 in FIGS. 2-4.

A first end part 72 of the first shift rod 68 may be connectable to the first power means 66 by means of the first coupling element 69. A first end part 73 of the second shift rod 70 may be connectable to the second power means 67 by means of the second coupling element 71. Such first and second coupling elements 69, 71 make it possible to connect and remove the shifting rods 68, 70 from the power means 66, 67 when assembling and disassembling the gearbox 2 in the vehicle 1.

In order to prevent damage in the range gearbox device 6 due to selecting an inappropriate gear when shifting gears in the range gearbox device 6 the shift control arrangement 3 according to an embodiment may be provided with a shift interlock 74. Such an impropriate selection of gears may be the selection of the low range gear when the range gearbox device 6 may be shifted into the reverse gear. A malfunction in a control system of the gearbox 2 may unintentional be activating the power means 66, 67 and move one of the first and second axially displaceable coupling sleeves 42, 43. As a result the gear wheels in the range gearbox device 6 and also the coupling sleeves 42, 43 could be damaged.

The shift interlock 74 comprises a first and a second lock pin 75, 79 which may be arranged at the main gearbox housing 12, which at least partly surrounds the main gearbox device 11. When arranging the lock pins 75, 79 at the main gearbox housing 12, the axial extension of a range gearbox device 6 arranged on the main gearbox device 11 can be reduced. The range gearbox device 6 can therefore be designed with a short axial extension which may reduce the weight of the range gearbox device 6. Thus, assembling and disassembling the range gearbox device 6 in the vehicle 1 will be easy.

Figure 5:
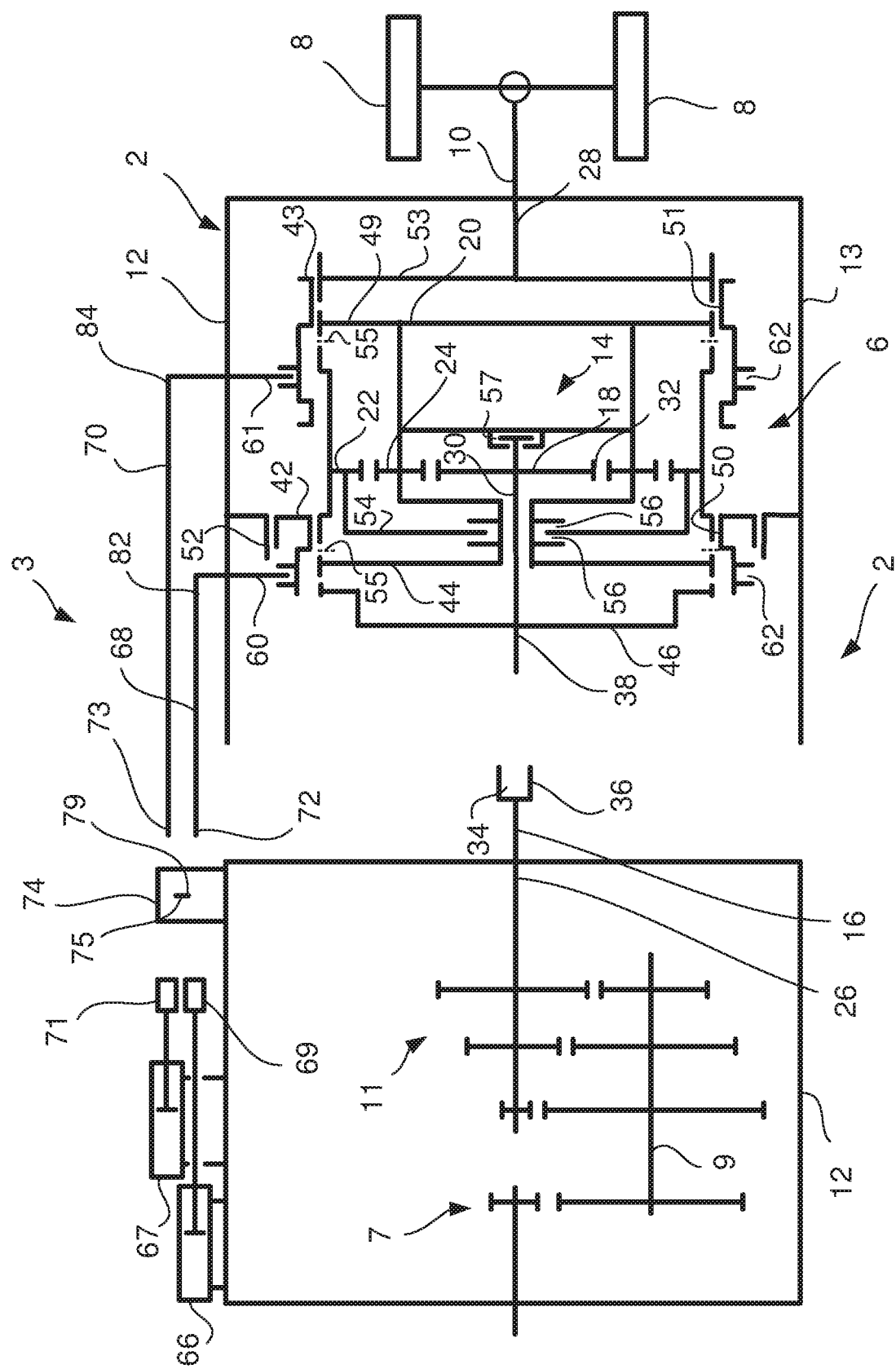
FIG. 5 shows schematically a cross section of the gearbox in FIG. 2 in a disassembled condition.

FIG. 5 shows schematically a cross section of the gearbox in FIG. 2 in a disassembled condition. The first and second shift rods 68, 70 have been disconnected from the first and second coupling element 69, 70, and the range gearbox device 6 has been disassembled from the main gearbox device 11. The main shaft 26 has also been disconnected from the shaft 38 of the sun gear 18 by means of the splines connection 34. The propeller shaft 10 may also have been disconnected from the output shaft 28 of the range gearbox device 6 before the range gearbox device 6 may be disassembled from the main gearbox device 11. Thus, the range gearbox device 6 has been disassembled in one piece from the rest of the main gearbox device 11, which may reduce the maintenance costs since the time required for the repair may decrease.

FIGS. 6*a*-6*b* show schematically a shift control arrangement 3 according to an embodiment from above and in a cross section. FIG. 6*a* shows the shift control arrangement from above. The first shift rod 68 may be provided with a first and second end part 72, 82, which second end part 82 may be connected to the first shift fork 60. The second shift rod 70 may be provided with a first and second end part 73, 84, which second end part 84 may be connected to the second shift fork 61. A first set of grooves 86 may be arranged in the first shift rod 68 and a second set of grooves 88 may be arranged in the second shift rod 70. The first and second lock pins 75, 79 may be arranged on top of each other. The first and second lock pins 75, 79 may be arranged in a common guide hole 92 in the main gearbox housing 12. The first and second lock pins 75, 79 may be arranged between the first and second shift rods 68, 70. The second set of grooves 88 may comprise a first and second groove 94, 95, each extending in an axial direction of the second shift rod 70, so that each of the first and second grooves 94, 95 may be common for two shift gears in the gearbox 2. The first set of grooves 86 comprises a third, fourth, fifth and sixth groove 96, 97, 98, 99, may each be related to a shift gear in the gearbox 2.

FIG. 6*b* shows a cross section of the shift control arrangement 3 through line I-I in FIG. 6*a*. The first and second lock pins 75, 79 may be arranged close to each other and between the first and second shift rods 68, 70. They may be slidably arranged on each other so that they may be allowed to move back and forth in their longitudinal direction. The first and second lock pins 75, 79 may be provided with a surface with reduced friction, so that the lock pins 75, 79 may slide easy on each other and against the inner surfaces of the guide hole 92 in the main gearbox housing 12. Such surface of the lock pins 75, 79 may be achieved by polishing or by arranging a layer on the surface, which layer may provide for low friction. Depending on the position of the shift rods 68, 70 they may move in their longitudinal direction into one of the grooves 96, 97, 98, 99 or they may be restricted to move in the longitudinally direction by the outer circumferential surface of the shift rods 68, 70 if one of the grooves 96, 97, 98, 99 may not be positioned in the longitudinal direction of the lock pins 75, 79.

The first, third and fourth grooves 94, 96 and 97 may be arranged above a plane 101 passing through the first and second shift rods 68, 70. The second, fifth and sixth grooves 95, 98, 99 may be arranged below the plane 101 passing through the first and second shift rods 68, 70. The plane 101 passing through the first and second shift rods 68, 70 may coincide with a centreline of the first and second shift rods 68, 70. However, the plane 101 may pass through the first and second shift rods 68, 70 without coinciding with the centreline of the first and second shift rods 68, 70. The plane 101 may be not a physical plane such as component, which cooperates with other components in the shift control arrangement 3. The plane 101 may only be used for describing how the grooves 94, 95, 96, 97, 98, 99, the lock pins 75, 79 and the shift rods 68, 70 relate to each other. The first lock pin 75 may be arranged to slide into the first groove 94 arranged in the first shift rod 68 and into the third and fourth grooves 96 and 97 arranged in the second shift rod 70 depending on the position of the respective shift rod 68, 70. The second lock pin 79 may be arranged to slide into the second groove 95 arranged in the first shift rod 68 and into the fifth and sixth grooves 98, 99 arranged in the second shift rod 70 depending on the position of the respective shift rod 68, 70.

FIGS. 7*a*-12*b* show schematically a shift control arrangement 3 according to an embodiment in different shift gear positions. In FIGS. 7*a*-15*a* the shift control arrangement 3 is shown from above. FIGS. 7*b*-15*b* show a cross section of the shift control arrangement 3 through line II-II in FIG. 6*b*.

Figure 7B:
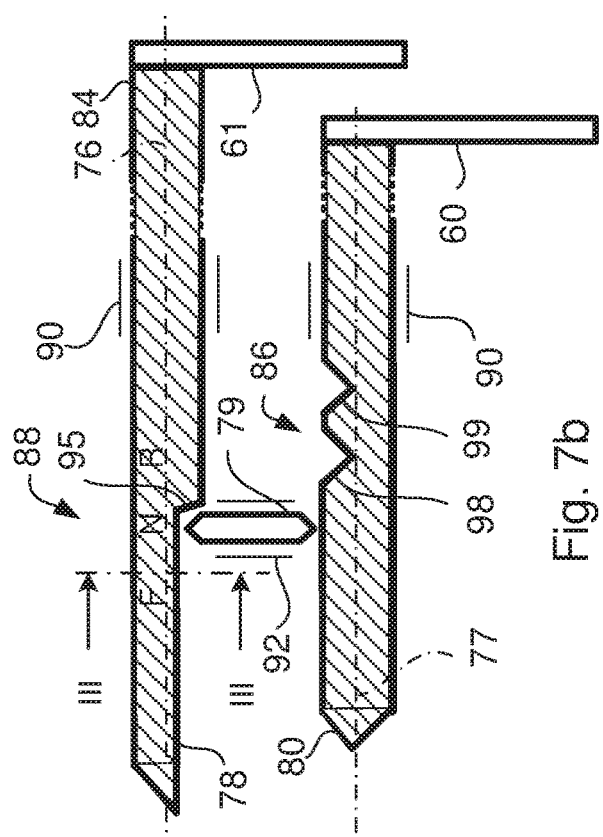
Figure 7A:
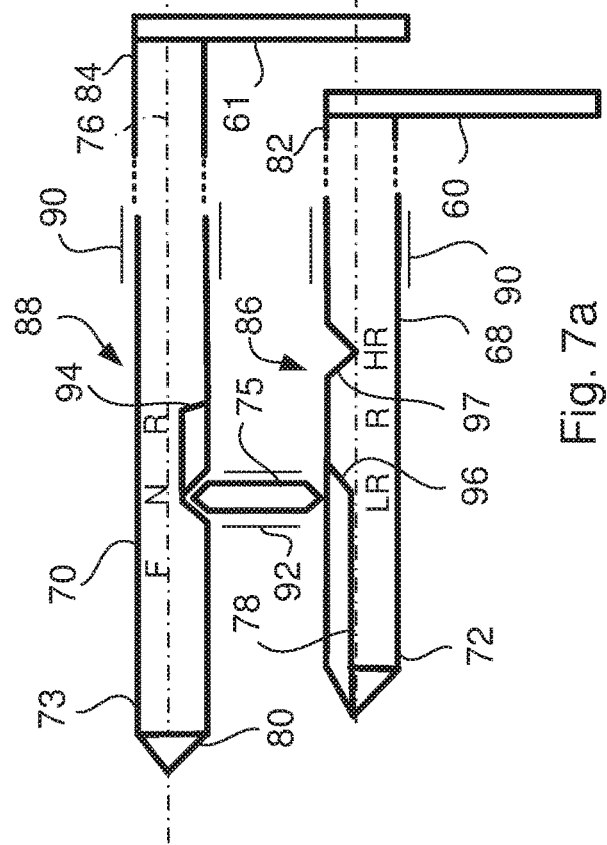

In FIGS. 7*a* and 7*b* the second set of grooves 88 comprises the first and second groove 94, 95, each extending in an axial direction of the second shift rod 70, so that each of the first and second grooves 94, 95 may be common for two shift gears in the gearbox 2. The first set of grooves 86 comprises the third, fourth, fifth and sixth grooves 96, 97, 98, 99, each may be related to a shift gear in the gearbox 2. The first groove 94 may be arranged to cooperate with the third and fourth grooves 96, 97 by means of the first lock pin 75, and the second groove 95 may be arranged to cooperate with the fifth and sixth grooves 98, 99 by means of the second lock pin 79. The first groove 94 may relate to a neutral and a reverse shift gear in the gearbox 2 and the second groove 95 may relate to a neutral and a forward shift gear in the gearbox 2. The third and fourth grooves 96, 97 may relate to a low range gear and a high range gear, respectively, and the fifth and sixth grooves 98, 99 may relate to a reverse gear and a high range gear, respectively. The first and second shift rod 68, 70 may each have a central axis 77, 76, respectively. The first and second shift rod 68, 70 each may be arranged in a guide bore 90 in the main gearbox housing 12. However, the first and second shift rods 68, 70 and first and second lock pins 75, 79 may alternatively be arranged in guide bores and guide holes in the range gearbox housing 13.

The first end parts 72, 73 of the first and second shift rod 68, 70 may be provided with an axial directed cut out 78 for non-conflicting with the lock pins 75, 79, and the first end parts 72, 73 of the first and second shift rod 68, 70 may be provided with a control surface 80 for axial movement of the lock pins 75, 79.

The control surfaces 80 and the axial directed cut outs 78 may make it easy to assemble and disassemble the gearbox 2 in a vehicle 1, because the shift rods 68, 70 may be assembled to the power means 66, 67 after a main gearbox device 11 first has been mounted to the vehicle 1. In addition, instead of removing the complete gearbox 2 from the vehicle 1 only the range gearbox device 6 may need be disassembled from the vehicle 1. When moving the shifting rods 68, 70 in an axial direction during assembling and disassembling the gearbox 2 the lock pins 75, 79 may allow this movement due to the control surfaces 80 and the axial directed cut-outs 78.

In FIGS. 7a and 7b, the shift control arrangement 3 is shifted into a neutral position, and the shift control arrangement may be prepared to shift the range gearbox device 6 into a low range position.

The first and second lock pins 75, 79 may be arranged between the first and second shift rod 68, 70, which lock pins 75, 79 together with the first set of grooves 86 and the second set of grooves 88 may be arranged to restrict or allow axial movement of the respective first and second shift rod 68, 70.

The first and second lock pins 75, 79 may have a pointed shape in both ends, which may make it possible for the shift rods 68, 70 to move the lock pins 75, 79 axially in the main gearbox housing 12 when shifting gears in the gearbox 2. The first set of grooves 86 together with the lock pins 75, 79 may be arranged to prevent the first shift rod 68 to move axially and to allow the second shift rod 70 to move axially. The second set of grooves 88 together with the lock pins 75, 79 may be arranged to prevent the second shift rod 70 to move axially and to allow the first shift rod 68 to move axially. When the lock pins 75, 79 is arranged within a groove 96, 97, 98, 99 in the first set of grooves 86, the second shift rod 70 may be allowed to move axially and the first shift rod 68 may be restricted to move. When the lock pins 75, 79 is arranged within a groove 94, 95 in the second set of grooves 88, the first shift rod 68 may be allowed to move axially and the second shift rod 70 may be restricted to move.

In FIGS. 7a and 7b, the second shift rod 70 has been moved to a neutral position and the first lock pin 75 is free to move into the first groove 94 of the second shift rod 70 when the second shift rod 70 is moved into the neutral position. The first shift rod 68 has been moved into the low range position. When the first shift rod 68 is moved into the low range position, the third groove 96 in the first shift rod 68 may be positioned in line with the first lock pin 75. In order to move the second shift rod 70 to the forward position mode the second shift rod 70 will move the first lock pin 75 axially and into the third groove 96 in the first shift rod 68. The second lock pin 79 may be prevented to move axially because the second lock pin 79 may not be aligned with a groove in the first shift rod 68. However, since the second groove in the second shift rod 70 may be extended in the axial direction of the second shift rod 70, the second shift rod 70 may be free to move into the forward position mode. In FIGS. 8a and 8b the range gear box may be shifted into the low range position in the forward position mode.

It is evident from FIGS. 7a and 7b that it is not possible to move the second shift rod 70 to the critical reverse position. The second shift rod 70 cannot push the second lock pin 79 in the axial direction when trying to move the second shift rod 70 in the left direction in FIGS. 7a and 7b.

Therefore, the second groove 95 together with the second lock pin 79 prevents the second shift rod 70 to the critical reverse position. This is also evident from FIG. 2. If the second coupling sleeve 43 would be axially displaced into the reverse position, in which the second coupling sleeve 43 connects the ring gear wheel 22 with the output shaft 28, the output shaft 28 would be locked to a standstill position, because the ring gear wheel 22 may be locked to the range gearbox housing 13 by means of the first coupling sleeve 42. This would probably damage the gearbox 2 or other components in the powertrain 15.

Figure 9B:
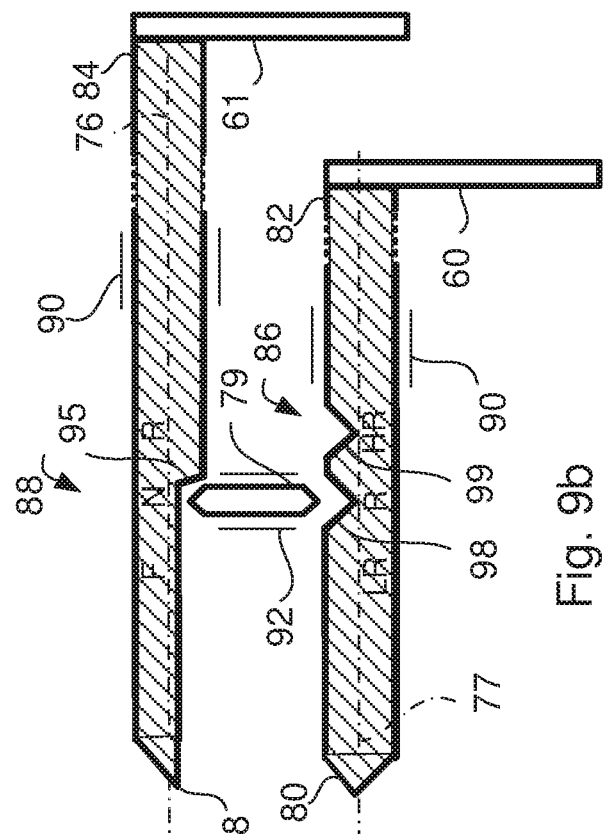
Figure 9A:
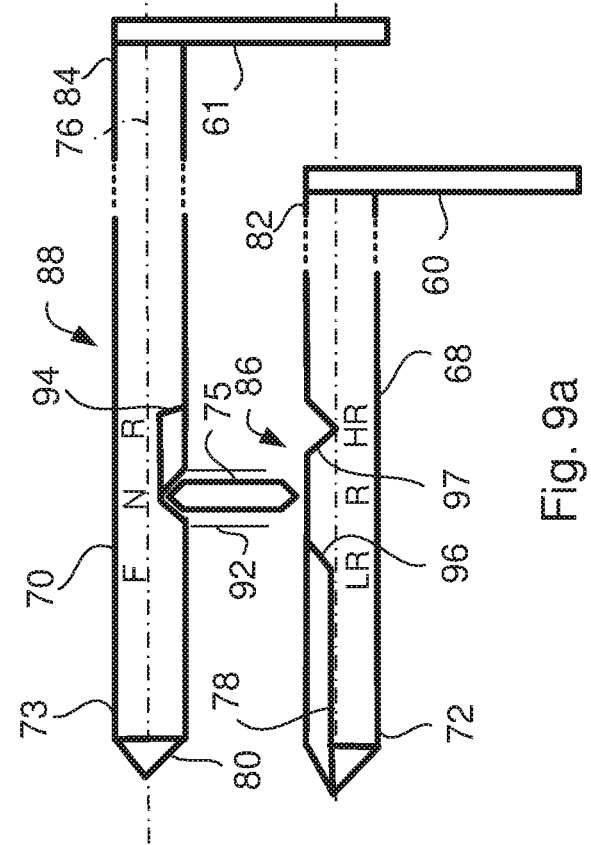
Figure 15:
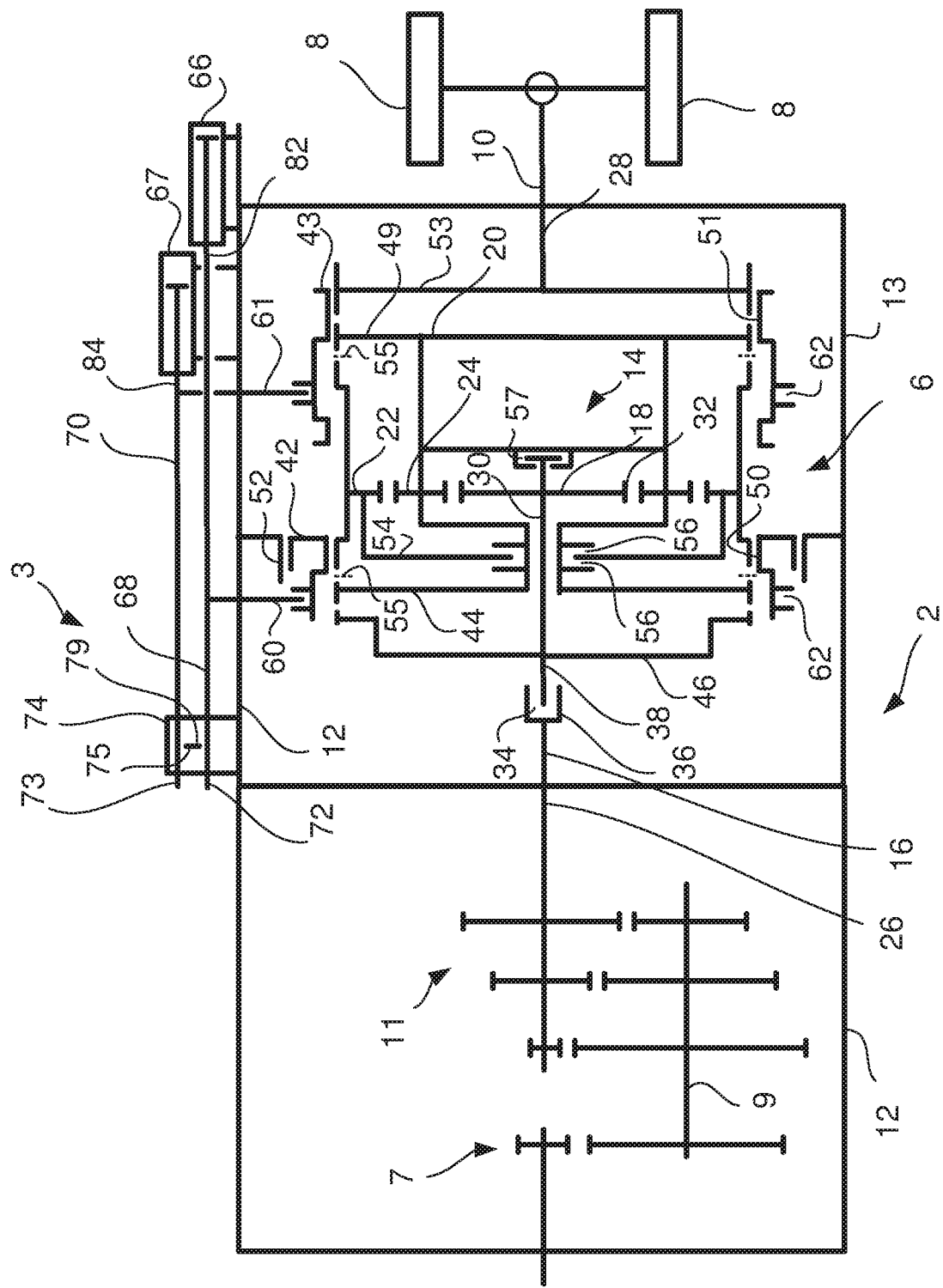
FIG. 15 shows schematically a cross section of the gearbox according to an embodiment.

FIGS. 9a and 9b show schematically a shift control arrangement 3 according to an embodiment in a neutral position, and which may be prepared to shift the range gearbox device 6 into a reverse position.

The first lock pin 75 may be restricted to move axially but the second lock pin 79 may be allowed to move axially due to the fifth groove 98 in the first shift rod 68. Therefore it may be possible to move the second shift rod 70 since the first groove 94 in the second shift rod 70 may be extended in the axial direction of the second shift rod 70 and also that it may be possible to displace the second lock pin 79 into the fifth groove 98 and allow the second shift rod 70 to move axially. In FIGS. 10a and 10b, the range gearbox device 6 may be shifted into the reverse position.

It is evident from FIGS. 9a and 9b that it is not possible to move the second shift rod 70 to the critical forward position. The second shift rod 70 cannot push the first lock pin 75 in the axial direction when trying to move the second shift rod 70 in the right direction in FIGS. 9a and 9b. Therefore, the first groove 94 together with the first lock pin 75 prevents the second shift rod 70 to the critical forward position. This is also evident from FIG. 3. If the second coupling sleeve 43 would be axially displaced into the forward position, in which the second coupling sleeve 43 connects the planet wheel carrier 20 with the output shaft 28, the output shaft 28 would be locked to a standstill position, because the planet wheel carrier 20 may be locked to the range gearbox housing 13 by means of the first coupling sleeve 42. This would probably damage the gearbox 2 or other components in the powertrain 15.

FIGS. 11a and 11b show schematically a shift control arrangement 3 according to an embodiment in a neutral position, and which may be prepared to shift the range gearbox device 6 into a high range position. In the high range position both forward and reverse modes may be optional because neither the forward mode nor the reverse mode may be critical for the gearbox 2 when the range gearbox device 6 is shifted into the high range mode.

It is evident from FIGS. 11a and 11b that it is possible to move the second shift rod 70 to the forward position as well as the reverse position. The second shift rod 70 may be able push the first lock pin 75 in the axial direction when trying to move the second shift rod 70 in the right direction in FIGS. 11a and 11b and thus shift the gearbox 2 into the forward mode. In addition, the second shift rod 70 may be able push the second lock pin 79 in the axial direction when trying to move the second shift rod 70 in the left direction in FIGS. 11a and 11b and thus shift the gearbox 2 into the reverse mode. This is also evident from FIG. 3. The second coupling sleeve 43 can be axially displaced into the forward position and into the reverse position without damage the gearbox 2 or other components in the powertrain 15. The reason for this is that the first coupling sleeve 42 may not be connected to the range gearbox housing 13. In FIGS. 12a and 12b, the second shift rod 70 has been moved to the forward position mode.

FIGS. 13a and 13b show schematically the shift control arrangement according to an embodiment in a first pre-assembled position. When assembling the range gearbox device 6 to the main gearbox device 11 the first and second shift rods 68, 70 may already be mounted on the range gearbox device 6. The lock pins 75, 79 have been mounted on the main gearbox device 11 before the main gearbox device 11 was mounted to the vehicle. Because the shift control arrangement 3 may be situated on top of the range gearbox device 6 to the main gearbox device 11 the lock pins 75, 79 will not be easy to remove before the range gearbox device 6 is assembled to the main gearbox device 11. Since the first end parts 72, 73 of the first and second shift rods 68, 70 may be provided with a control surface 80 for axial movement of the lock pins 75, 79, and the first end parts 72, 73 of the first and second shift rod 68, 70 may be provided with an axial directed cut out 78 for non-conflicting with the lock pins 75, 79 it may be easy to assemble the range gearbox device 6 in the vehicle 1 even though the main gearbox device 11 may be already mounted in the vehicle 1.

During the assembling of the range gearbox device 6 in the vehicle the first and second shift rods 68, 70 may be pushed axially through guide bores 90 in the main gearbox housing 12. When the first and second shift rods 69, 70 reaches the lock pins 75, 79, the control surface 80 of the first end parts 72, 73 of the first and second shift rods 68, 70 urge the lock pins 75, 79 to move axially in the guide hole 92 in the main gearbox housing 12. The lock pins 75, 79 move axially in the direction of the respective first and second shift rods 68, 70 which may be provided with the axial directed cut outs 78 on the first end parts 72, 73 of the respective shift rods 68, 70.

In FIGS. 14a and 14b the shift control arrangement 3 according to an embodiment is schematically shown in a second pre-assembled position, where the lock pins 75, 79 have been moved axially in the direction of the first and second shift rods 68, 70 and has reached the axial directed cut outs 78 on the first end parts 72, 73 of the first and second shift rods 68, 70. Since the axial directed cut-outs 78 is non-conflicting with the lock pins 75, 79 both the first and second shift rods 68, 70 is free to move axially in direction to the first and second power means 66, 67 in order to be connected to the first and second connection elements 69, 71.

The disassembling of the range gearbox device 6 from the main gearbox device 11 takes place in the opposite direction.

The control surfaces 80 of the first and second end parts 72, 73 of the first and second shift rods 68, 70 may have an angle between 10° and 80°. Alternatively, they may be 30°-60° in relation to a central axis 76 of the shift rods 68, 70. Such a control surface 80 will move the lock pins 75, 79 axially when the first and second shift rods 68, 70 may be moved axially and the control surfaces 80 may be in contact with the lock pins 75, 79. The first and second coupling elements 69, 71 shown in FIGS. 2-5 may be adapted to the control surfaces 80 and the axial directed cut outs 78 so that they may be connected to the first and second end parts 72, 73 of the first and second shift rods 68, 70. However, according to an embodiment shown in FIG. 15, the shift interlock 74, comprising the first and second lock pins 75, 79, may be arranged at the range gearbox housing 13. The first and second end parts 72, 73 of the first and second shift rods 68, 70 may be arranged as free ends, which are not connected to any coupling elements. Instead, the first and second shift rods 68, 70 may be connected to the first and second power means 66, 67 at opposite distal ends. The first and second shift forks 60, 61 may be arranged on the first and second shift rods 68, 70 at a position between the first and second end parts 72, 73 and the first and second power means 66, 67.

Figure 16A:
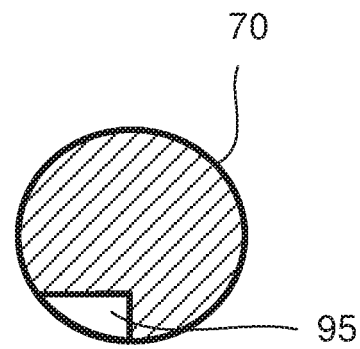
Figure 16B:
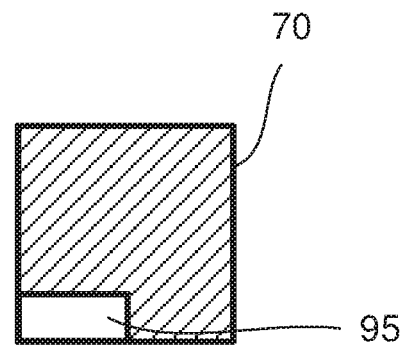

FIGS. 16a-16b show schematically two different embodiments of a cross section through line III-III of the second shift rod 70 in FIG. 7a. According to an embodiment shown in FIG. 16a, the second groove 95 of the second shift rod 70 may be flat and the overall cross section of the second shift rod 70 may be circular. This makes it possible to move the second shift rod 70 axially when the second lock pin 79 may be received in the second groove 95. A cross section through the first groove 94 of the second shift rod 70 shows similar characteristics.

According to the embodiment shown in FIG. 16b the second groove 95 of the second shift rod 70 may be flat and the overall cross section of the second shift rod 70 may be square. This makes it possible to move the second shift rod 70 axially when the second lock pin 79 may be received in the second groove 95. A cross section through the first groove 94 of the second shift rod 70 shows similar characteristics according to this embodiment. However, the second shift rod 70 may also have another shaped cross section.

In addition, the first shift rod 68 may have a cross section provided with a shape that may be similar to the shape of the second shift rod 70.

The foregoing description of the preferred embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the embodiments in terms of its various embodiments and with the various modifications that are applicable to its intended use. The components and features specified above may, within the framework of the embodiments, be combined between different embodiments specified.

The invention claimed is:

1. A shift control arrangement in a gearbox, said arrangement comprising:
   a first shift rod, provided with a first and second end part, which first end part of said first shift rod is connectable to a first power means and the second end part of said first shift rod is connected to a first shift fork;
   a second shift rod, provided with a first and second end part, which first end part of said second shift rod is connectable to a second power means and the second end part of said second shift rod is connected to a second shift fork;
   a first set of grooves arranged in the first shift rod;
   a second set of grooves arranged in the second shift rod; and
   a first and a second lock pin arranged between the first and second shift rods, wherein the first lock pin is arranged on the second lock pin, and the first and second lock pins are slidably arranged against each other, which first and a second lock pins together with the first and second set of grooves are arranged to restrict or allow axial movement of the respective first and second shift rod,
   wherein the first set of grooves comprises at least one groove arranged in the first shift rod above a plane passing through the first and second shift rods, and at least one groove arranged below the plane, and wherein the second set of grooves comprises at least one groove arranged in the second shift rod above the plane and at least one groove arranged below the plane.

2. A shift control arrangement according to claim 1, wherein the first lock pin is arranged above the plane and the second lock pin is arranged below the plane.

3. A shift control arrangement according to claim 1, wherein the first and second lock pins are arranged in a common guide hole in a main gearbox housing.

4. A shift control arrangement according to claim 3, wherein the first and second shift forks are arranged in a range gearbox device, which is connectable to the main gearbox device.

5. A shift control arrangement according to claim 1, wherein the second set of grooves, comprises a first and second groove, each extending in an axial direction of the second shift rod, so that each of the first and second groove of said second set of grooves is common for two shift gears in the gearbox.

6. A shift control arrangement according to claim 5, wherein the first groove of said second set of grooves relates to a neutral and a reverse shift gear in the gearbox and the second groove of said second set of grooves relates to a neutral and a forward shift gear in the gearbox.

7. A shift control arrangement according to claim 5,
wherein the first set of grooves comprises a third, fourth, fifth and sixth groove, each related to a shift gear in the gearbox, and
wherein the first groove of said second set of grooves is arranged to cooperate with the third and fourth grooves of said first set of grooves by means of the first lock pin and the second groove of said second set of grooves is arranged to cooperate with the fifth and sixth grooves of said first set of grooves by means of the second lock pin.

8. A shift control arrangement according to claim 1, wherein the first end part of the first shift rod is connectable to the first power means by means of a first coupling element; and the first end part of the second shift rod is connectable to the second power means by means of a second coupling element.

9. A shift control arrangement according to claim 1, wherein the first set of grooves, together with the first and a second lock pins, are arranged to prevent the first shift rod to move axially and to allow the second shift rod to move axially; and the second set of grooves, together with the first and a second lock pins, are arranged to prevent the second shift rod to move axially and to allow the first shift rod to move axially.

10. A shift control arrangement in a gearbox, said arrangement comprising:
a first shift rod, provided with a first and second end part, which first end part of said first shift rod is connectable to a first power means and the second end part of said first shift rod is connected to a first shift fork;
a second shift rod, provided with a first and second end part, which first end part of said second shift rod is connectable to a second power means and the second end part of said second shift rod is connected to a second shift fork;
a first set of grooves arranged in the first shift rod, wherein the first set of grooves comprises a third, fourth, fifth and sixth groove, each related to a shift gear in the gearbox;
a second set of grooves arranged in the second shift rod; and
a first and a second lock pin arranged between the first and second shift rods, which first and a second lock pins together with the first and second set of grooves are arranged to restrict or allow axial movement of the respective first and second shift rod,
wherein the first set of grooves comprises at least one groove arranged in the first shift rod above a plane passing through the first and second shift rods, and at least one groove arranged below the plane, and
wherein the second set of grooves comprises at least one groove arranged in the second shift rod above the plane and at least one groove arranged below the plane.

11. A shift control arrangement according to claim 10, wherein the third and fourth grooves of said first set of grooves relate to a low range gear and a high range gear, respectively, and in that the fifth and sixth grooves of said first set of grooves relate to a reverse gear and a high range gear, respectively.

12. A shift control arrangement in a gearbox, said arrangement comprising:
a first shift rod, provided with a first and second end part, which first end part of said first shift rod is connectable to a first power means and the second end part of said first shift rod is connected to a first shift fork;
a second shift rod, provided with a first and second end part, which first end part of said second shift rod is connectable to a second power means and the second end part of said second shift rod is connected to a second shift fork;
a first set of grooves arranged in the first shift rod;
a second set of grooves arranged in the second shift rod; and
a first and a second lock pin arranged between the first and second shift rods, which first and a second lock pins together with the first and second set of grooves are arranged to restrict or allow axial movement of the respective first and second shift rod,
wherein the first end part of the first shift rod is provided with an axial directed cut out so as to not contact the first lock pin, the first end part of the second shift rod is provided with a control surface for axial movement of the first lock pin, the first end part of the second shift rod is provided with an axial directed cut out so as to not contact the second lock pin, and the first end part of the first shift rod is provided with a control surface for axial movement of the second lock pin,
wherein the first set of grooves comprises at least one groove arranged in the first shift rod above a plane passing through the first and second shift rods, and at least one groove arranged below the plane, and
wherein the second set of grooves comprises at least one groove arranged in the second shift rod above the plane and at least one groove arranged below the plane.

* * * * *